United States Patent
De Aquino

(10) Patent No.: US 7,296,480 B2
(45) Date of Patent: Nov. 20, 2007

(54) METHOD AND DEVICE FOR MONITORING A FLEXIBLE PIPE

(75) Inventor: Roberto Jourdan De Aquino, Rio de Janeiro (BR)

(73) Assignee: Technip France (FR)

( * ) Notice: Subject to any disclaimer, the term of this patent is extended or adjusted under 35 U.S.C. 154(b) by 172 days.

(21) Appl. No.: 10/528,382

(22) PCT Filed: Sep. 11, 2003

(86) PCT No.: PCT/FR03/02694

§ 371 (c)(1),
(2), (4) Date: May 18, 2005

(87) PCT Pub. No.: WO2004/027310

PCT Pub. Date: Apr. 1, 2004

(65) Prior Publication Data

US 2005/0210961 A1   Sep. 29, 2005

(30) Foreign Application Priority Data

Sep. 18, 2002  (FR) .................... 02 11556

(51) Int. Cl.
*G01N 3/26* (2006.01)
(52) U.S. Cl. .......................... 73/847; 73/768
(58) Field of Classification Search ............... 73/49.5, 73/847, 783, 40.5 R, 768
See application file for complete search history.

(56) References Cited

U.S. PATENT DOCUMENTS

| | | | |
|---|---|---|---|
| 3,972,223 A | 8/1976 | Torghele | |
| 4,775,855 A | 10/1988 | Cox | |
| 6,240,160 B1 * | 5/2001 | Daaland et al. | ............... 378/59 |

FOREIGN PATENT DOCUMENTS

| | | |
|---|---|---|
| FR | 2214852 | 9/1974 |
| FR | 2626974 | 8/1989 |
| FR | 2777966 | 10/1999 |
| FR | 2791768 | 10/2000 |
| FR | 2836201 | 8/2003 |
| GB | 2057696 | 4/1981 |
| GB | 2148447 | 5/1985 |
| JP | 09225023 A * | 9/1997 |
| JP | 11-344390 | 12/1999 |

(Continued)

OTHER PUBLICATIONS

International Search Report for International Application No. PCT/FR 03/02694 dated Feb. 18, 2004.

*Primary Examiner*—Hezron Williams
*Assistant Examiner*—Paul M West
(74) *Attorney, Agent, or Firm*—Ostrolenk, Faber, Gerb & Soffen, LLP

(57) ABSTRACT

A device for monitoring the integrity of a flexible pipe used for transporting a pressurized fluid in a terminal end-fitting. The pipe includes an internal pressure sheath, plies of tensile armor wires and an outer sheath fastened to the end-fitting. A device monitors the change in a phenomenon associated with a failure of the armor plies as a result of a fracture of several tensile armor wires inside the end-fitting. The device detects an increase in the twist in the pipe near the end-fitting, which twist is a phenomenon of a fracture of tensile armor wires inside the end-fitting.

8 Claims, 1 Drawing Sheet

FOREIGN PATENT DOCUMENTS

| | | |
|---|---|---|
| WO | WO 97/25564 | 7/1998 |
| WO | WO 99/32862 | 7/1999 |
| WO | WO 00/49398 | 8/2000 |
| WO | WO 02/39003 | 5/2002 |
| WO | WO 03/071179 | 8/2003 |

* cited by examiner

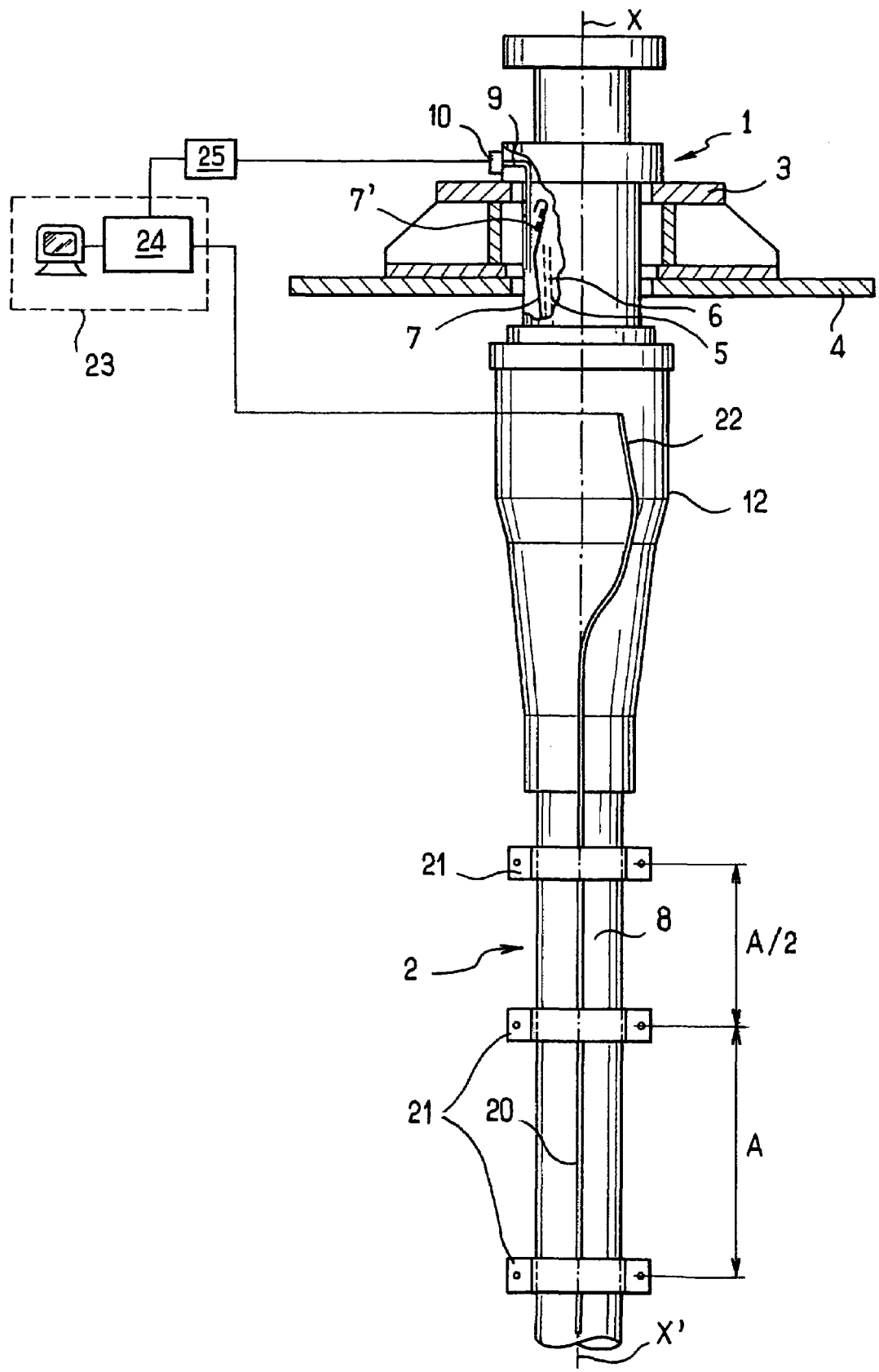

METHOD AND DEVICE FOR MONITORING A FLEXIBLE PIPE

CROSS REFERENCE TO RELATED APPLICATION

The present application is a 35 U.S.C. §§ 371 national phase conversion of PCT/FR2003/002694 filed 11 Sep. 2003, which claims priority of French Application No. 02/11556 filed 18 Sep. 2002. The PCT International Application was published in the French language.

BACKGROUND OF THE INVENTION

The present invention relates to a method of monitoring a flexible pipe for transporting, over long distances, a fluid that is under pressure and possibly at a high temperature, such as a gas, oil, water or other fluids. The invention relates more particularly to the monitoring and warning of problems associated with a fracture of the armor wires of the flexible pipe in the vicinity of or inside the terminal end-fitting, where they are anchored, especially in a terminal end-fitting for a rising flexible pipe, called a "riser", intended for offshore oil production. The present invention also relates to a device associated with the monitoring method.

Flexible pipes used offshore have various configurations depending on their precise use, but in general they satisfy the constructional criteria defined in particular in the API 17 B and API 17 J standards drawn up by the American Petroleum Institute under the title "Recommended Practice for Flexible Pipe" and "Specification for Unbonded Flexible Pipe". These pipes comprise, from the inside outward:

an internal sealing sheath or pressure sheath, made of a plastic, generally a polymer, resistant to the chemical action of the fluid to be transported;

optionally, a pressure vault resistant mainly to the pressure developed by the fluid in the sealing sheath and consisting of the winding of one or more interlocked metal profiled wires, which may or may not be self-interlockable, that are wound in a helix with a short pitch (i.e. with a lay angle of close to 90°) around the internal sheath; the profiled wires have a cross section in the form of a Z or a T or their derivatives (teta® or zeta), or in the form of a U or an I; the said pressure vault may also include a hoop;

at least one ply (and generally at least two crossed plies) of tensile armor plies wound with a long pitch, the lay angle measured along the longitudinal axis of the pipe being less than 60°; and an external protective sealing sheath made of a polymer.

Such a pipe may have a smooth internal bore, when the bore is formed directly by the sealing sheath (the pipe is then called a smooth bore pipe) or may have a rough bore, when a carcass consisting, for example, of an interlocked metal strip serving to prevent the pipe from collapsing under the external pressure is furthermore provided inside the internal sealing sheath.

The end-fittings for the pipes, which are intended for connecting them together or to terminal equipment, are also defined in the API 17 J recommendations and must be produced under conditions ensuring both good fastening and good sealing. They are generally obtained by crimping the sheath, that is to say by the partial radial penetration of a rigid element into the sheath.

Several types of end-fittings for flexible pipes using the principle of crimping the internal sheath are known, especially from documents FR 2 214 852 or WO 99/19655, or else from document WO 97/25564 in the name of the Assignee hereof, and document PCT/FR01/03305 also in the name of the Assignee. The latter document describes in particular a fastening end-fitting for a flexible tubular pipe, comprising a first annular portion (generally called the vault of the end-fitting) to which may bear a first crimping flange provided with a cone for crimping the internal sheath and a second annular portion (generally called a cap) which surrounds, and extends rearwards, the first annular portion and on which a second crimping flange can bear. The second crimping flange is provided with a cone for crimping the external sheath, cooperating with a rear crimping support sleeve. The second annular portion defines with the first annular portion an annular space in which the tensile armor plies are placed in such a way that they are radially separate from the internal sheath so as to pass around the first crimping flange and the first annular portion in order to be fastened thereto. The end-fitting includes a collar for immobilizing the armor wires between the first crimping flange and the second crimping flange. The aforementioned annular space is intended to be filled with a filling material such as a resin which will immobilize the various elements lying in this space.

It is known to monitor the integrity of a pipe and a pipe end-fitting over time using various methods and devices for the purpose of detecting certain anomalies.

Thus, methods are known for inspecting the inside of a pipe, using an inspection "pig" traveling along the pipe and giving, for example, video images or identifying a possible retraction of the carcass at an end-fitting by an eddy current system and associated sensors (see FR 2 790 087 in the name of the Assignee). Besides the fact that such methods give information about the carcass but not directly about the sheath (in the case of rough bore pipes), they have a drawback of requiring production to be temporarily stopped in order to send the pig into the pipe.

Methods are also known for detecting leaks in pipes (FR 2 626 974 and U.S. Pat. No. 4,775,855) or for detecting the imminent fracture of a pipe using sensor elements placed on the pipe (GB 2 057 696).

Methods have also been developed that are more specifically associated with the monitoring of end-fittings because it has been noted that these are the site of certain types of deterioration over time. It is useful to be able to detect in time such deterioration in order to be able to intervene in a programmed manner on the pipe and on the end-fitting, and to carry out the necessary repairs or replacements.

In particular, it is known and recommended to monitor the position of the pressure sheath by regular inspection.

To be able to obtain sheath displacement information effectively, it has been proposed in document WO 98/12545 to provide markers on the element to be monitored, the displacement of which markers can be detected by X-rays using an X-ray detector or an X-ray sensitive photographic film. In all cases, this requires heavy equipment and also requires production to be stopped in order to be able to place the detector around the pipe.

The Assignee has also proposed, in French application No. 02/02155, a detection method and an associated end-fitting that can provide information about the displacement of the pressure sheath or of other layers of the pipe without having to stop production. The end-fitting is suitable for detection, because it is equipped directly with a sensor for detecting the displacement of a given layer in the pipe, especially the pressure sheath.

Document U.S. Pat. No. 3,972,223 relates to a method and to a device for monitoring the integrity of a pipe over its length or over the length of each of its sections. The document provides for elongate bladders to be placed in the thickness of the multilayer wall of the pipe, said bladders being filled with a pressurized fluid and communicating via tubes with one or more pressure gauges. Any impact along the length of the pipe, or destruction of the layers of the wall of the pipe, results in variations of the pressure of the fluid contained in the bladders, these being detected by the pressure gauge or gauges. However, that document does not in any way show that this method can be used for monitoring the end-fittings themselves.

Document GB 2 148 447 shows a connection end-fitting. An annular space lying between two armor plies experiences its pressure measured using a pressure gauge, to which the annular space is connected via a bore. This pressure gauge can detect anomalies in the leakage rate that may indicate damage of the armor plies, this damage not necessarily being located in the end-fitting. That document therefore does not teach monitoring in the terminal end-fitting either.

All these monitoring methods help as far as possible to prevent production incidents in the pipe. However, in certain causes of impairment to the flexible pipe the end-fitting cannot be detected by the existing method. This is especially the case as regards the fracture of certain of the wires forming the tensile armor plies. Such fracture of the wires, which is progressive over time, may result in destruction of the end-fitting and therefore of the pipe when the number of wires damaged increases. Thus, the present invention is aimed at improving the monitoring of the terminal end-fittings of flexible pipes so as to prevent sudden production stoppages. It essentially consists in monitoring, and giving warning about, potential incidents relating to the integrity of the wires of the tensile armor plies inside the end-fitting.

SUMMARY OF THE INVENTION

The invention achieves its objective thanks to a method of monitoring the integrity of a flexible pipe for transporting a pressurized fluid in a terminal end-fitting. The pipe comprises, in particular, an internal pressure sheath, plies of tensile armor wires and an outer sheath fastened to the end-fitting. The method comprises monitoring the integrity of the tensile armor plies in the end-fitting by monitoring the change in the twist in the flexible pipe as a phenomenon associated with the disorganization of the armor plies as a result of fracture of several tensile armor wires inside the end-fitting. To the knowledge of the Applicant, it has never previously been proposed to monitor the integrity of the armor plies in the pipe end-fitting, nor have the phenomena warning of the failure of the tensile armor plies, especially the twist in the pipe, ever been examined.

Thus, according to the invention, to monitor the integrity of the armor plies, the twist in the flexible pipe near the end-fitting is monitored, for example by means of strain gauges, especially one or more extensometric gauges. These gauges may especially be placed on or in contact with the external sheath of the pipe, near the terminal end-fitting. This is because breakage of the armor wires in the end-fitting results in an imbalance in the forces and tensions in the superposed plies, resulting in a twist in the pipe. This twist thus has a tendency to adopt a "corkscrew" or "pig-tail" form near the end-fitting where the break of the armor wires occurs and it is this twist or at least its progressive appearance that can be monitored according to this first embodiment.

It is advantageous to combine this twist detection with the monitoring of one or more parameters associated with the escape of gas at the end-fitting, and more precisely at one of the discharge valves provided in the end-fitting and more commonly called gas drainage valves. This is because when the flexible pipe is transporting a fluid containing gases (a polyphase fluid), certain gases diffuse into the annulus between the pressure sheath and the outer sheath. These gases are drained away in the annulus to the end-fittings where they are discharged via these valves (generally three in number in the end-fittings). The fracture of the armor wires in the end-fitting results in an elongation of the pipes which stresses the sealing sheath to the point of inducing fracture in the sealing barrier for the internal bore of the pipe and therefore increases the gas flow in the annulus. This additional construction can therefore be used in hydrocarbon production risers or gas lift risers, but not on water injection risers. Escape of gas can be monitored by measuring one or more parameters associated with gas escape, such as the discharge frequency and/or discharge time and/or output of the valve, for example.

It is possible, and even recommended, to combine the two monitoring systems in order to increase the certainty of detection.

From the occurrence of an anomaly during the monitoring, it may be concluded that the integrity of the tensile armor plies has suffered due to the fracture of several of the constituent wires and thus giving warning about the risk of an imminent fracture of the pipe at the end-fitting, so as to take the necessary measures for protecting and safeguarding the pipe.

The invention also relates to the device associated with the method of the invention. This device for monitoring the integrity of a flexible pipe for transporting a pressurized fluid at a terminal end-fitting, said pipe comprises in particular an internal pressure sheath, plies of tensile armor wires and an outer sheath that are fastened to the end-fitting. It is noteworthy that the device comprises means for monitoring the change in a phenomenon due to the disorganization of the armor plies as a result of fracture of several tensile armor wires inside the end-fitting. These monitoring means are means for detecting an increase in the twist in the pipe near the end-fitting.

Advantageously, the monitoring means include a computing unit responsible for recovering and analyzing the signal sent by the pipe twist detection means. The same computing unit may serve for monitoring several risers that are equipped with said monitoring means and for triggering an alarm when the detection means have detected an anomaly in one of the pipes being monitored.

BRIEF DESCRIPTION OF THE DRAWING

Other advantages and features will be demonstrated on reading the description that follows with reference to the appended FIGURE which shows schematically a terminal pipe end-fitting, with partial cutaway, equipped with detection means according to the invention.

DESCRIPTION OF A PREFERRED EMBODIMENT

The FIGURE shows highly schematically an end-fitting 1 which is symmetric about its longitudinal axis XX' coincident with the central axis of the pipe 2. The end-fitting, partially covered with a stiffener 12, includes a connection flange 3 for fastening to a platform 4. The pipe 2 comprises, as is known, a carcass 5 and its pressure sheath 6, tensile armor plies 7 and an outer sheath 8. These various constituent elements are fastened and crimped to the inside of the end-fitting 1 by various means known per se, especially those known from document WO 02/39003 or document U.S. Pat. No. 6,039,083. For example, the armor plies may be held in place by collars 7' and embedded in a resin. Moreover, the gases appearing in the annulus of the pipe 2 are connected in a line 9 that communicates with the outside via a staged valve 10 or gas drainage valve (only one of the three valves normally present has been shown). A staged differential valve is known, for example from document FR 2 777 966 or document U.S. Pat. No. 2,420,370. These elements, which are known per se, do not require to be described in further detail. Besides, the invention does not depend on the precise configuration of the end-fitting and of the pipe, rather it can be implemented on other types of end-fitting and on a pipe other than that illustrated here. The description of the end-fitting is given merely by way of indication of one possible embodiment in which the invention can be implemented and likewise the flexible pipe may have a different internal structure with regard to the number of constituent layers and their nature.

In the method according to the invention for monitoring the integrity of the armor wires 7 or their anchoring in the end-fitting, the twist liable to be generated in the pipe because of the disorganization of the armor plies is monitored, it being possible for said twist to be detected in the sheath 8 of the pipe 2, near the end-fitting 1. To do this, the flexible pipe 2 is equipped with linear extensometers or gauges designed to detect the twists in the pipe. These gauges may, for example, take the form of a rod 20 (commonly called a "Smart Rod®") which is equipped with Bragg grating optical fibers. The pipe 2 may thus be equipped with one or more rods 20, each having several strain gauges and intended to deliver, to the analysis device 23 to which they are connected, information about the shape adopted by the flexible pipe 2 near the end-fitting. The positioning of the rod or rods and their nature depend essentially on the conditions under which the pipe is being used and on the desired detection sensitivity. In the example illustrated in FIG. 1, the monitoring device comprises a rod 20 mounted so as to slide in collars 21, there being three of said collars, spaced apart respectively by a distance A (the pitch of the external armor ply) and by a half-pitch A/2. This rod 20, which is equipped with extensometers (of the Bragg grating type) provides information about its flexure in each of the gaps between the collars 21, from which information it is possible to deduce whether or not there is a twist in the pipe 2. The number of rods needed to monitor a pipe and how they are installed along the sheath 8 near the end-fitting 1 essentially depends on the fine detail of the information needed for the monitoring. This or these rods 20 are connected by a connection 22 to the analysis device 23 which, by comparison with a given threshold, makes it possible to detect an abnormal twist of the pipe 2 and will generate an alarm that allows the user to anticipate the breakage of the flexible pipe at its terminal end-fitting and therefore to plan a production shutdown and the appropriate maintenance operations. This twist, detected by the extensometry sensors of the rod(s) 20, is a manifestation of a failure in the integrity of the wires of the armor plies 7.

The principle of linear gauges is well known, especially in the form of Bragg grating optical fibers. The reader may refer to documents FR 2 791 768 and WO 99/32862.

The computing unit 24, which constitutes the core of the analysis device 23, connected to the linear gauges located on the rod 20 is programmed to make a distinction between localized or transient deformations of the pipe, associated with its operating conditions (swell, current, etc.) and the permanent deformations that are symptomatic of a twist in the pipe 2 associated with failure of the tensile armor plies 7 inside the terminal end-fitting 1.

The FIGURE shows a rod 20 provided with linear gauges, this rod being placed on the outside of the pipe and even partly above the stiffener, this being more convenient in order to place the monitoring device on an existing installation. If the monitoring device is provided right from the beginning, it is possible to incorporate it between the stiffener and the external sheath of the pipe. It is also possible to integrate the detection means (the linear gauges, etc.) actually on the inside of the pipe, such as within the armor plies or elsewhere in the pipe near the end-fitting.

Of course, twist detection means other than extensometric gauges are possible.

In particular, it is possible to combine a twist detection that has just been applied with detection of a variation in the parameters associated with the exhausting of the drained gas in the annulus of the pipe 2. This exhausting takes place in one of the gas drainage valves 10 that are located in the terminal end-fitting 1. This monitoring is performed by means of a device comprising detection means 25 (for example pressure switches) connected to an analysis device 23 that can generate an alarm when variation in the frequency, in the flow rate or the discharge time, or even the pressure within the annulus, is symptomatic of a tensile armor ply failure problem. In fact such a failure involves progressive loss of sealing of the internal sheath at the point where it is crimped in the end-fitting, increasing the gas flow inside the internal sheath towards the annulus and therefore substantially modifying the parameters associated with exhausting the gas. The detection means 25 may be formed by pressure sensors or flow rate sensors that can deliver, in real time, to the analysis device (the computing unit) information associated with this exhausting of the drained gases. These sensors 25 may also measure all types of parameters associated with this exhausting, parameters which make it possible to deduce that there is a significant increase in the volume of gas drained to the outside through the gas draining valve 10. Thus, the sensors may measure the volume of drained gas directly or may measure the discharge frequency of the valve or even the time during which said valve is open, for example. The sensors 25 measure, for example, the discharge frequency and the computing unit 24 makes a comparison over the last five discharges in order to obtain therefrom information about a possible increase in the frequency associated with a failure of the tensile armor plies.

This method of monitoring the integrity of a flexible pipe in its terminal end-fitting and especially of a riser-type pipe (i.e. a pipe connecting sub-sea equipment to a surface installation) and the associated detection devices are advantageously applicable in existing offshore oil production systems, without which a plurality of risers is used. This is because each riser can be provided with detection means of the type described above, these means being intended to monitor the twist in the flexible pipe and optionally the discharge of the gases in a discharge valve of the end-fitting. All of said detection means are then connected to a common analysis device which allows the signals received to be analyzed in order to generate, if necessary, an alarm should a failure be detected in one or more tensile armor plies inside a terminal end-fitting of one of the risers.

The invention claimed is:

1. A method of monitoring integrity of a flexible pipe used for transporting a pressurized fluid in a terminal end-fitting of the flexible pipe, wherein the flexible pipe comprises at least an internal pressure sheath, plies of tensile armor wires and an outer sheath fastened to the end-fitting, the method comprising:

monitoring the integrity of the tensile armor plies of the flexible pipe in the end-fitting by detecting a change in a twist in the flexible pipe adjacent the end-fitting, wherein the twist change is a phenomenon associated with a failure of the armor plies as a result of a fracture of two or more tensile armor wires inside the end-fitting.

2. The method as claimed in claim 1, wherein the monitoring of the change in the twist in the flexible pipe is by at least one strain gauge placed on the external sheath of the pipe.

3. The method as claimed in claim 1, wherein the end-fitting includes a gas drainage valve, and the monitoring of the integrity comprises monitoring the quantity of gas escaping from the valve.

4. The method as claimed in claim 3, wherein the monitoring of the quantity of gas escaping comprises measuring a variation in at least one of a discharge frequency and in a discharge time of the gas.

5. A device for monitoring the integrity of a flexible pipe for transporting a pressurized fluid at a terminal end-fitting of the pipe, the pipe comprising at least an internal pressure sheath, plies of tensile armor wires and an outer sheath fastened to the end-fitting, the device for monitoring the integrity comprising:

a monitoring device operable for detecting a failure of the armor plies as a result of a fracture of two or more tensile armor wires inside the end-fitting, the monitoring device being operable to detect the failure by detecting an increase in a twist in the flexible pipe adjacent the end-fitting.

6. The device as claimed in claim 5, wherein the monitoring device for detecting an increase in the twist in the pipe comprises strain gauges at the pipe.

7. The device as claimed in claim 6, wherein the strain gauges comprise Bragg grating optical fibers.

8. The device as claimed in claim 5, wherein the monitoring device includes a computing unit operable to generate an alarm depending on anomalies the monitoring device detects.

* * * * *